No. 12,204. REISSUED MAR. 15, 1904.
E. D. CASTERLINE.
PAPER FOLDING MACHINE.
APPLICATION FILED JUNE 30, 1903.
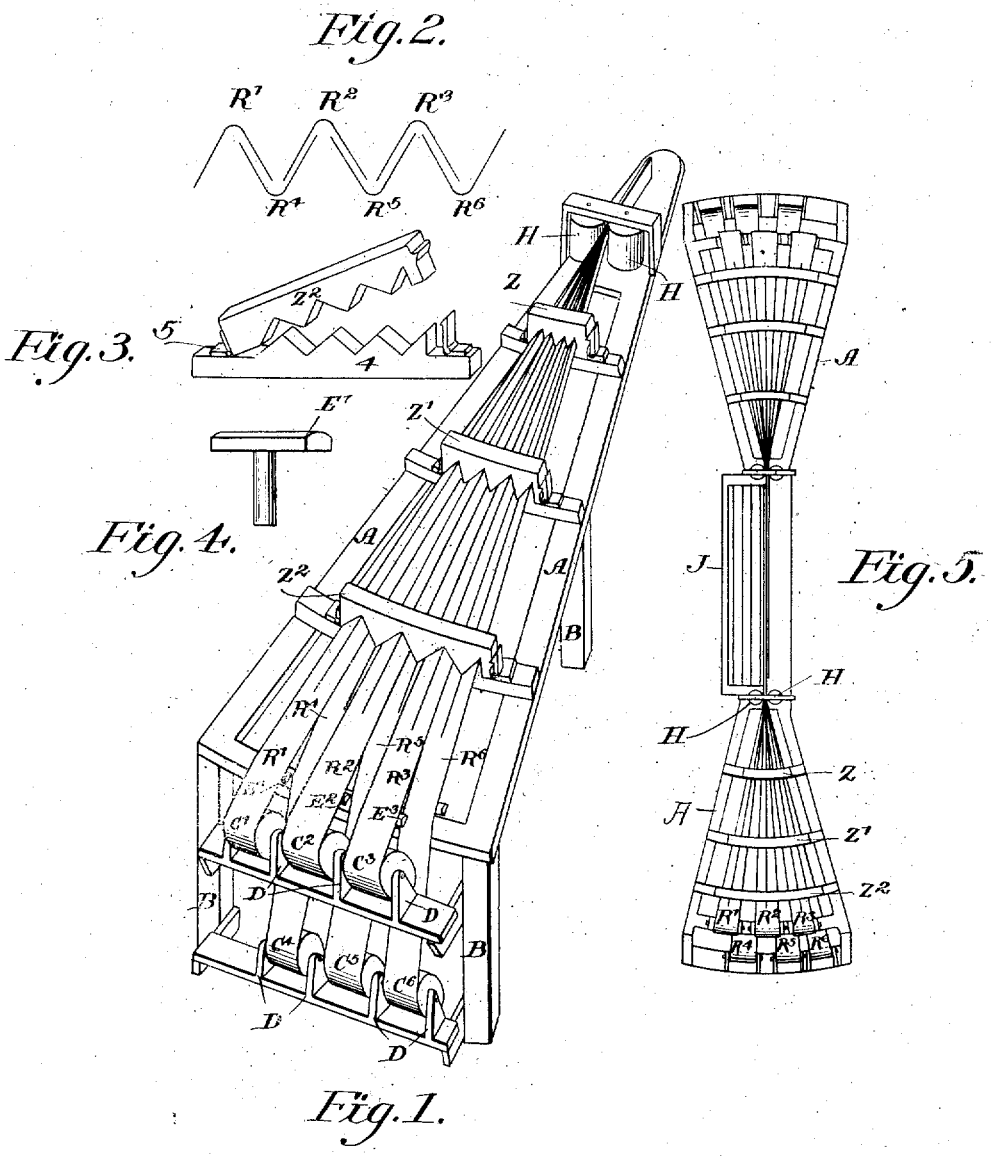
Witnesses
E. F. Stewart
Jno E Parker
Edwin D. Casterline, Inventor.
by C. A. Snow & Co.
Attorneys No. 12,204. Reissued March 15, 1904.

UNITED STATES PATENT OFFICE.

EDWIN DAKE CASTERLINE, OF LOS ANGELES, CALIFORNIA, ASSIGNOR TO THE SINGLE-SHEET PAPER COMPANY, OF LOS ANGELES, CALIFORNIA, A CORPORATION OF CALIFORNIA, AND THE INTERLOCK PAPER COMPANY, OF SAN FRANCISCO, CALIFORNIA, A CORPORATION.

PAPER-FOLDING MACHINE.

SPECIFICATION forming part of Reissued Letters Patent No. 12,204, dated March 15, 1904.

Original No. 654,515, dated July 24, 1900. Application for reissue filed June 30, 1903. Serial No. 163,829.

*To all whom it may concern:*

Be it known that I, EDWIN DAKE CASTERLINE, a citizen of the United States, residing at Los Angeles, county of Los Angeles, State of California, have invented a certain new and useful Improvement in Paper-Folding Machines; and I declare the following to be a full, clear, and exact description of the invention, such as will enable others skilled in the art to which it pertains to make and use the same, reference being had to the accompanying drawings, which form a part of this specification.

This invention relates to paper-folding machines, and has for its object an improved machine adapted to fold a number of long ribbons of paper, giving to each ribbon a single fold along its longitudinal middle line, and so arranging the consecutively-folded ribbons that each ribbon except the two outside ones embraces between its adjacent faces the edges of two adjacent ribbons of paper, one of which lies partly within and partly without on the one side and the other of which lies partly within and partly without on the other side. If the fold or crease of each ribbon be considered a midrib and the portions of the ribbons of paper at each side of the midrib be considered wings, then the consecutive ribbons of paper will take a position such that if the first ribbon have the midrib upward and the wings turned downward the second ribbon will have the midrib down and the wings turned upward. The upturned wing at the right of the second ribbon will underlie the downturned wing at the left of the first ribbon and the upturned wing at the left of the second ribbon will underlie the downturned wing at the right of the third ribbon and the third ribbon will have its midrib upward and its wings turned downward, so that the downturned right wing of the first ribbon and the downturned left wing of the third ribbon lie between the upturned wings of the second ribbon and the upturned right wing of the second ribbon and the upturned left wing of the fourth ribbon lie between the downturned wings of the third ribbon, and so on indefinitely for as many ribbons as may be desired.

The machine which is shown in the drawings is adapted to crease and fold twelve ribbons at a time, six of which are creased at the right end of the machine and six of which are creased at the left end of the machine, and the two bundles of ribbons are engaged together, so that the last ribbon of one bundle engages with the first ribbon of the second bundle, and after being engaged together the bundles are cut and other bundles of ribbons drawn from the right and left ends of the machine are laid alongside the second bundle, and the assembling is continuous until a large number of bundles have been brought into the described relation. The resulting long bundle of ribbon is then cut into short bundles, each one of which contains a number of rectangular and nearly-square sheets of paper, each of which sheets is engaged with two adjacent sheets in the way described. The short bundles of paper are placed in a box which is covered, and the cover of which is provided with a central slit that runs parallel to the folded edges of the sheets of paper that are in the box. The end of one sheet of paper is pulled through the slit, and when it is pulled farther through the slit and out of the box it draws with it the end of a second sheet of paper, which is left projecting through the slit in the box. The paper prepared and presented in this way can be drawn a sheet at a time from the box, but no faster.

In the drawings, Figure 1 is a perspective of the machine. Fig. 2 is a diagram indicating the position assumed by the ribbons of paper when partially folded. Fig. 3 is a detail of a drawing-die by which the paper is folded. Fig. 4 is a detail of a head-block over which the ribbons are drawn. Fig. 5 indicates the position of the two parts of the folding-machine assembled at the ends of a table on which the bundles of paper are gathered.

The right and left ends of the machine are alike, and the two parts are united by a trough in which the bundles of ribbons drawn from the right end of the machine and those drawn from the left end of the machine are assembled and gathered during the progress of the work of making the large bundle mentioned.

A A indicate the table-top, which, as shown, is of skeleton form and is supported on standards B B. Across the table at intervals are drawing-dies $Z^2$, $Z'$, and Z. These drawing-dies are similar in construction, and each consists of an under die-block, (shown in det il in Fig. 3,) and the under die-block has a number of serrations or teeth that rise above its surface. Hinged to the under block 4 is an upper block 3, which is also serrated, and the serrations of the lower block 4 engage in the notches between the serrations of the upper block 3, and the serrations of the upper block 3 engage in the notches of the lower block 4. The surface of the serrations of the one part do not, however, touch the surfaces of the serrations of the other part. The block 3 is held to block 4 by hinge 5 and by hook 6, and when the two parts of the drawing-die are closed together there is between them a corrugated or wavy opening through which the ribbons of paper are drawn. There are preferably several drawing-dies, the outermost of which has serrations with broad bases and shallow notches and the innermost of which has serrations of narrow bases and deep notches, the intermediate drawing-dies having serrations of which the bases are narrower than the first and less narrow than the last and the notches deeper than the first and less deep than the last die.

The ribbons of paper $R'$, $R^2$, $R^3$, $R^4$, $R^5$, and $R^6$ are drawn from reels $C'$, $C^2$, $C^3$, $C^4$, $C^5$, and $C^6$, and each reel is provided with a journal that is supported in bearings D D at the end of the table. Preferably the bearings are on an arched support and are equally distant from vertical guides H H, that lie at the inner end of this section of the machine. Between the reel-supports D and the first die $Z^2$ the ribbons pass over head-blocks $E'$, $E^2$, $E^3$, $E^4$, $E^5$, and $E^6$. The head-blocks bring the ribbons of paper to the same or nearly the same plane and produce on each ribbon an equal tension. The ribbons drawn through the die-blocks are creased and begin to assume the relative position shown in Fig. 2, and as they pass through consecutive die-blocks and finally between the guides H H they are closed in with the edges infolded, as described. The bundle of ribbon drawn from the right end of the machine is laid in the trough J and pressed against the side *j* of the trough; but the outermost ribbon on the free side is opened out partially and the first ribbon of the bundle drawn from the left of the machine is laid in the open angle of the last ribbon of the first bundle drawn, and the two bundles when pressed up against the side of the trough become a single bundle. The outermost ribbon of the compound bundle is again arranged to engage with the inner ribbon of a bundle drawn from the right of the machine. The workman continues to draw alternately from the right and the left until he has formed a compound bundle of the desired number of ribbons, and this may be any number. When complete, the compound bundle thus formed is a long bundle, perhaps fifteen or twenty feet in length, and when compressed sidewise it is from two to three inches, or perhaps more, in thickness. The long bundle thus produced is removed from the trough and cut into short lengths, and the short lengths are stored in boxes or bundles for use.

What I claim is—

1. In a ribbon-bundling machine, means for longitudinally advancing a plurality of ribbons and interfolding each interjacent ribbon with a plurality of adjacent ribbons.

2. In a ribbon-bundling machine, means for longitudinally advancing and transversely bending a plurality of ribbons to interfold each interjacent ribbon with the ribbons on opposite sides thereof.

3. In a ribbon-bundling machine, means for longitudinally advancing and transversely bending and condensing a plurality of ribbons to interfold each interjacent ribbon with the ribbons on opposite sides thereof.

4. In a ribbon-bundling machine, means for longitudinally advancing a plurality of ribbons, and means for transversely bending and interfolding each interjacent ribbon with the ribbons on opposite sides thereof.

5. In a ribbon-bundling machine, means for longitudinally advancing and transversely bending a plurality of ribbons, and means for transversely condensing the ribbons to interfold each interjacent ribbon with the ribbons on opposite sides thereof.

6. In a ribbon-bundling machine, means for longitudinally feeding a plurality of ribbons into the machine, and means for forming the ribbons into a bundle in which each interjacent ribbon is interfolded with the ribbons on opposite sides thereof.

7. In a ribbon-bundling machine, means for forming a longitudinal crease in each ribbon and interfolding the ribbons to form a web in which each interjacent ribbon is interfolded with the ribbons on opposite sides thereof, and means for feeding the ribbons in the direction of their length to such creasing and interfolding means.

8. In a ribbon-bundling machine, means for forming a longitudinal crease in each ribbon and for progressively interfolding the ribbons to form a web in which each interjacent ribbon is interfolded with ribbons on both sides.

9. In a ribbon-bundling machine, means for progressively forming a longitudinal crease in each ribbon and for interfolding the ribbons to form a web in which each interjacent ribbon is interfolded with ribbons on both sides.

10. In a ribbon-bundling machine, means for forming an approximately central longitudinal crease in each ribbon and for simultaneously and progressively interfolding the ribbons to form a web in which each interjacent ribbon is interfolded with ribbons on both sides.

11. In a ribbon-bundling machine, means for simultaneously creasing a plurality of continuous ribbons and progressively interfolding the same during the creasing operation to thereby form a web in which interjacent ribbons are interfolded with ribbons on both sides.

12. In a ribbon-bundling machine, a plurality of convergent folders adapted to form longitudinal creases in a plurality of ribbons and to simultaneously and progressively interfold the ribbons to form a web in which each interjacent ribbon is interfolded with ribbons on both sides.

13. A machine for interfolding a plurality of strips or ribbons, comprising a plurality of folding devices arranged on convergent lines and adapted to independently and progressively fold the strips or ribbons and to simultaneously interfold the progressively-folding strips with each other.

14. A folding-machine comprising a plurality of folding devices arranged on convergent lines and each adapted for independent engagement with a strip to be folded, said folding devices serving to progressively fold the independent strips and simultaneously interfold the progressively-folding strips with each other.

15. A device for interfolding a plurality of independent strips comprising a plurality of converging members adapted to fold alternate strips in opposite directions, the construction being such that the independent strips are progressively interfolded to form a compact web at the discharge end of the machine.

16. A machine for interfolding independent strips of material, comprising independent strip-holders, and convergent dies adapted to give each strip a longitudinal fold and during the folding operation to progressively interfold the wings of each strip with the wings of adjacent strips on either side of it.

17. In a paper-folding machine, the combination of means for holding rolls of paper ribbon, drawing-dies each of which consists of two serrated blocks with the serrations of the one block engaging in the serrations of the other block, but spaced therefrom sufficiently to allow the free passage of the paper ribbon through it, said dies being adapted to give to each ribbon a longitudinal fold and to infold the wings of each ribbon between the wings of the adjacent ribbons at each side of it, substantially as described.

18. In a machine for folding paper, the combination of means for holding rolls of paper ribbon, drawing-dies each of which consists of two serrated blocks with the teeth of one block engaging in the notches of the other, whereby the paper may be drawn through said dies and folded longitudinally, and the guides H between which the ribbons are finally compressed, substantially as described.

19. In a machine for folding ribbons of paper together with each ribbon folded lengthwise, and with the wings of each ribbon engaged between the wings of two adjacent ribbons, a trough or table, a folding mechanism at each end of said table provided with serrated folding-dies, whereby ribbons of paper folded lengthwise may be drawn from each folding mechanism, and the ribbon from one mechanism engaged with the ribbon from the opposite mechanism, substantially as described.

In testimony whereof I sign this specification in the presence of two witnesses.

EDWIN DAKE CASTERLINE.

Witnesses:

S. O. HOUGHTON,

E. P. HOUGHTON.